(12) United States Patent
Langhammer et al.

(10) Patent No.: US 11,163,530 B2
(45) Date of Patent: Nov. 2, 2021

(54) PROGRAMMABLE-LOGIC-DIRECTED MULTIPLIER MAPPING

(71) Applicant: Intel Corporation, Santa Clara, CA (US)

(72) Inventors: Martin Langhammer, Alderbury (GB); Gregg William Baeckler, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 15/933,057

(22) Filed: Mar. 22, 2018

(65) Prior Publication Data

US 2019/0042197 A1 Feb. 7, 2019

Related U.S. Application Data

(60) Provisional application No. 62/616,929, filed on Jan. 12, 2018.

(51) Int. Cl.
*G06F 7/53* (2006.01)
*G06F 7/544* (2006.01)
*G06F 30/34* (2020.01)
*G06N 20/00* (2019.01)
*G06F 30/327* (2020.01)
(Continued)

(52) U.S. Cl.
CPC .......... *G06F 7/5312* (2013.01); *G06F 7/5306* (2013.01); *G06F 7/5443* (2013.01); *G06F 30/327* (2020.01); *G06F 30/34* (2020.01); *G06F 30/392* (2020.01); *G06F 30/394* (2020.01); *G06N 20/00* (2019.01); *G06F 2111/04* (2020.01); *G06F 2111/20* (2020.01); *G06F 2119/12* (2020.01)

(58) Field of Classification Search
CPC .......... G06F 7/53–7/5312; G06F 7/533; G06F 7/5306

See application file for complete search history.

(56) References Cited

U.S. PATENT DOCUMENTS

| | | | |
|---|---|---|---|
| 7,720,901 B1 * | 5/2010 | Ball | G06F 7/53 708/620 |
| 7,765,249 B1 * | 7/2010 | Pugh | G06F 7/5324 708/230 |

OTHER PUBLICATIONS

H Parandeh-Afsharetal., A Flexible DSP Block to Enhance FPGA Arithmetic Performance, 2009 International Conference on Field-Programmable Technology, IEEE 2010 (Year: 2010).*

(Continued)

*Primary Examiner* — Emily E Larocque
(74) *Attorney, Agent, or Firm* — Fletcher Yoder, PC

(57) ABSTRACT

Multiplier circuitry includes first combinatorial circuitry configured to perform a combinatorial function, based at least in part on redundant form arithmetic, to generate a first subset of two or more partial products. The two or more partial products are based at least in part on a first input to the multiplier circuitry and a second input to the multiplier circuitry. The multiplier circuitry also includes a carry chain that includes a second combinatorial circuitry configured to generate a second subset of the two or more partial products based at least in part on the first input and the second input. Furthermore, the carry chain includes one or more binary ripple-carry adders configured to generate a product of the multiplier circuitry based at least in part on a sum of the two or more partial products.

20 Claims, 12 Drawing Sheets

(51) Int. Cl.
G06F 30/392 (2020.01)
G06F 30/394 (2020.01)
G06F 111/04 (2020.01)
G06F 111/20 (2020.01)
G06F 119/12 (2020.01)

(56) References Cited

OTHER PUBLICATIONS

Z. Tasnim Sworna et al., An Efficient Design of an FPGA-Based Multiplier Using LUT Merging Theorem, 2017 IEEE Computer Society Annual Symposium on VLSI, 2017 (Year: 2017).*

M. Langhammer and B. Pasca, "Floating-Point DSP Block Architecture for FPGAs," 2015 ACM/SIGDA International Symposium on Field-Programmable Gate Arrays, ser. FPGA '15. New York, NY, USA: ACM, 2015, pp. 117-125. [Online]. Available: http://doi.acm.org/10.1145/2684746.2689071.

Microsoft unveils Project Brainwave for real-time AI, 2017, https://www.microsoft.com/en-us/research/blog/microsoft-unveils-project-brainwave/.

Arria10 Device Overview, 2014, http://www.altera.com/literature/hb/arria-10/a10 overview.pdf.

Deep Learning with INT8 Optimization on Xilinx Devices, 2017, https://www.xilinx.com/support/documentation/whitepapers/wp486-deep-learning-int8.pdf.

M. Kumm, S. Abbas, and P. Zipf, "An Efficient Softcore Multiplier Architecture for Xilinx FPGAs," 2015 IEEE 22nd Symposium on Computer Arithmetic, Jun. 2015, pp. 18-25.

E. G. Walters, "Partial-Product Generation and Addition for Multiplication in FPGAs with 6-Input LUTs," 2014 48th Asilomar Conference on Signals, Systems and Computers, Nov. 2014, pp. 1247-1251.

O. L. MacSorley, "High-speed Arithmetic in Binary Computers," Proceedings of the IRE, vol. 49, No. 1, pp. 67-91, Jan. 1961.

M. Langhammer and G. Baeckler, "High Density and Performance Multiplication for FPGA," 25th IEEE Symposium on Computer Arithmetic ARITH 25, Jun. 25, 2018.

* cited by examiner

450

| COLUMN | 8 | 7 | 6 | 5 | 4 | 3 | 2 | 1 | 0 |
|---|---|---|---|---|---|---|---|---|---|
| PP0 | 0 | 0 | 0 | 0 | A | B | C | D | E |
| PP1 | 0 | 0 | 0 | F | G | H | I | J | 0 |
| PP2 | 0 | 0 | K | L | M | N | P | 0 | 0 |
| PP3 | 0 | Q | R | S | T | U | 0 | 0 | 0 |
| PP4 | V | W | X | Y | Z | 0 | 0 | 0 | 0 |

| COLUMN | 8 | 7 | 6 | 5 | 4 | 3 | 2 | 1 | 0 |
|---|---|---|---|---|---|---|---|---|---|
| PP0 | 0 | 0 | K | L | A | B | C | D | E |
| PP1 | 0 | 0 | 0 | F | G | H | I | J | 0 |
| PP2 | 0 | 0 | 0 | 0 | M | 0 | 0 | 0 | 0 |

| COLUMN | 8 | 7 | 6 | 5 | 4 | 3 | 2 | 1 | 0 |
|---|---|---|---|---|---|---|---|---|---|
| PP3 | 0 | Q | R | S | T | U | P | 0 | 0 |
| PP4 | V | W | X | Y | Z | N | 0 | 0 | 0 |

FIG. 9

| COLUMN 8 | COLUMN 7 | COLUMN 6 | COLUMN 5 | COLUMN 4 | COLUMN 3 | COLUMN 2 | COLUMN 1 | COLUMN 0 |
|---|---|---|---|---|---|---|---|---|
| PP0 | K | L | A | B | C | D | E |  |
| PP1 | | $AUX_3$ | $AUX_2$ | $AUX_1$ | H | I | J |  |

| COLUMN | 8 | 7 | 6 | 5 | 4 | 3 | 2 | 1 | 0 |
|---|---|---|---|---|---|---|---|---|---|
| PP0 | 0 | 0 | K | L | A | B | C | D | E |
| PP1 | 0 | 0 | $AUX_2 \oplus L$ | $AUX_2$ | $AUX_1$ | H | I | J | 0 |

| COLUMN | 11 | 10 | 9 | 8 | 7 | 6 | 5 | 4 | 3 | 2 | 1 | 0 |
|---|---|---|---|---|---|---|---|---|---|---|---|---|
| PP0 | 0 | 0 | 0 | 0 | 0 | 0 | $A_6$ | $A_5$ | $A_4$ | $A_3$ | $A_2$ | $A_1$ |
| PP1 | 0 | 0 | 0 | 0 | 0 | $B_6$ | $B_5$ | $B_4$ | $B_3$ | $B_2$ | $B_1$ | 0 |
| PP2 | 0 | 0 | 0 | 0 | $C_6$ | $C_5$ | $C_4$ | $C_3$ | $C_2$ | $C_1$ | 0 | 0 |
| PP3 | 0 | 0 | 0 | $D_6$ | $D_5$ | $D_4$ | $D_3$ | $D_2$ | $D_1$ | 0 | 0 | 0 |
| PP4 | 0 | 0 | $E_6$ | $E_5$ | $E_4$ | $E_3$ | $E_2$ | $E_1$ | 0 | 0 | 0 | 0 |
| PP5 | 0 | $F_6$ | $F_5$ | $F_4$ | $F_3$ | $F_2$ | $F_1$ | 0 | 0 | 0 | 0 | 0 |

| COLUMN | 11 | 10 | 9 | 8 | 7 | 6 | 5 | 4 | 3 | 2 | 1 | 0 |
|---|---|---|---|---|---|---|---|---|---|---|---|---|
| PP0+PP1 | 0 | 0 | 0 | 0 | $X_7$ | $X_6$ | $X_5$ | $X_4$ | $X_3$ | $X_2$ | $X_1$ | XL |
| PP2+PP3 | 0 | 0 | $Y_7$ | $Y_6$ | $Y_5$ | $Y_4$ | $Y_3$ | $Y_2$ | $Y_1$ | YL | 0 | 0 |
| PP4+PP5 | $Z_7$ | $Z_6$ | $Z_5$ | $Z_4$ | $Z_3$ | $Z_2$ | $Z_1$ | ZL | 0 | 0 | 0 | 0 |

| COLUMN | 11 | 10 | 9 | 8 | 7 | 6 | 5 | 4 | 3 | 2 | 1 | 0 |
|---|---|---|---|---|---|---|---|---|---|---|---|---|
| PP0+PP1 | $Z_7$ | $Z_6$ | $Z_5$ | $Z_4$ | $X_7$ | $X_6$ | $X_5$ | $X_4$ | $X_3$ | $X_2$ | $X_1$ | XL |
| PP2+PP3 | 0 | 0 | $Y_7$ | $Y_6$ | $Y_5$ | $Y_4$ | $Y_3$ | $Y_2$ | $Y_1$ | YL | 0 | 0 |
| PP4+PP5 | 0 | 0 | 0 | 0 | $Z_3$ | $Z_2$ | $Z_1$ | ZL | 0 | 0 | 0 | 0 |

900

| COLUMN | 11 | 10 | 9 | 8 | 7 | 6 | 5 | 4 | 3 | 2 | 1 | 0 |
|---|---|---|---|---|---|---|---|---|---|---|---|---|
| LINE 0 | $Z_7$ | $Z_6$ | $S_4$ | $S_3$ | $HS_2$ | $S_2$ | $HS_1$ | $S_1$ | $X_3$ | $X_2$ | $X_1$ | XL |
| LINE 1 | 0 | $C_4$ | $C_3$ | $HC_2$ | $C_2$ | $HC_1$ | $C_1$ | 0 | $Y_1$ | YL | 0 | 0 |

| COLUMN | 11 | 10 | 9 | 8 | 7 | 6 | 5 | 4 | 3 | 2 | 1 | 0 |
|---|---|---|---|---|---|---|---|---|---|---|---|---|
| LINE 0 | $Z_7$ | $Z_6$ | $S_4$ | $S_3$ | $HS_2$ | $S_2$ | $HS_1$ | $S_1$ | $SL_2$ | $SL_1$ | $X_1$ | $XL$ |
| LINE 1 | 0 | $C_4$ | $C_3$ | $HC_2$ | $C_2$ | $HC_1$ | $C_1$ | $CL_2$ | $CL_1$ | 0 | 0 | 0 |

| COLUMN | 7 | 6 | 5 | 4 | 3 | 2 | 1 | 0 |
|---|---|---|---|---|---|---|---|---|
| PP0 | 0 | 0 | (A) | (A) | A | B | C | D |
| PP1 | 0 | 0 | (E) | E | F | G | H | 0 |
| PP2 | (I) | (I) | I | J | K | L | 0 | 0 |
| PP3 | (M) | M | N | P | Q | 0 | 0 | 0 |

| 7 | 6 | 5 | 4 | 3 | 2 | 1 | 0 |
|---|---|---|---|---|---|---|---|
| $(S_4)$ | $S_4$ | $S_3$ | $S_2$ | $S_1$ | L | 0 | 0 |
| $C_4$ | $C_3$ | $C_2$ | $C_1$ | COMP | 0 | 0 | 0 |

FIG. 20

PROGRAMMABLE-LOGIC-DIRECTED MULTIPLIER MAPPING

CROSS-REFERENCE TO RELATED APPLICATION

This application claims priority to U.S. Provisional Patent Application No. 62/616,929, filed Jan. 12, 2018, entitled "Synthesis for FPGA Embedded Feature Placement," the contents of which is incorporated by reference in its entirety for all purposes.

BACKGROUND

The present disclosure relates generally to integrated circuits, such as field programmable gate arrays (FPGAs). More particularly, the present disclosure relates to mapping multipliers to programmable logic implemented on an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine learning is becoming increasingly valuable in a number of technical fields. For example, machine learning may be used in natural language processing, computer vision, such as object recognition, bioinformatics, and economics, among other fields and applications. Further, much of the computation involved in machine learning is based on inference, which may be facilitated by one or more multipliers, according to previously available data. Accordingly, to accommodate growth and improvement of machine learning implementations and applications, the number of multipliers implemented in an integrated circuit may increase. However, multipliers may consume significant area, power, and routing resources of the integrated circuit.

BRIEF DESCRIPTION OF THE DRAWINGS

Various aspects of this disclosure may be better understood upon reading the following detailed description and upon reference to the drawings in which:

FIG. 7 is a table mapping partial product generation and alignment for a 5×5 multiplier, in accordance with an embodiment;

FIG. 8 is a first subset of partial products included in the table of FIG. 7, in accordance with an embodiment;

FIG. 9 is a second subset of partial products included in the table of FIG. 7, in accordance with an embodiment;

FIG. 10 is a refactored mapping of the first subset of partial products of FIG. 8, in accordance with an embodiment;

FIG. 11 is a second refactored mapping of the first subset of partial products of FIG. 8, in accordance with an embodiment;

FIG. 12 is a table mapping partial product generation and alignment for a 6×6 multiplier, in accordance with an embodiment;

FIG. 13 is a table mapping partial product pairs generated from the summation of the partial products of FIG. 12, in accordance with an embodiment;

FIG. 14 is a refactored table mapping the partial product pairs of FIG. 13, in accordance with an embodiment;

FIG. 16 is a refactored table mapping the partial product pairs of FIG. 14, in accordance with an embodiment;

FIG. 18 is a refactored table mapping the partial product pairs of FIG. 16, in accordance with an embodiment;

FIG. 19 is a table mapping the partial product pair alignment of a 4×4 signed multiplier, in accordance with an embodiment;

FIG. 20 is a refactored table mapping the partial product pairs of FIG. 19, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to increasing the density of multipliers implemented on an integrated circuit. More specifically, the present disclosure relates to more efficient mapping of multipliers to programmable logic. These multipliers may be implemented as soft multipliers, which are memory-based multipliers. Since current integrated circuits may be better suited for other logic applications, such as random logic, than for soft multipliers, by reducing the logic and routing involved with the implementation of the soft multipliers, the soft multipliers may use less area and/or resources, may use less power, and may run faster as they handle computations. Accordingly, an integrated circuit may support a greater number of the soft multipliers.

To reduce the logic and routing involved with implementing and/or mapping the multipliers to programmable logic, multiplier regularization may be performed on the multipliers. As will be discussed in further detail below, multiplier regularization may include factoring out a partial product level of a multiplier by utilizing combinatorial circuits to perform processing out of band from soft logic associated with a carry chain (e.g., adder chain) of the multiplier. Additionally or alternatively, multiplier regularization may include refactoring arithmetic performed by the multiplier so that ternary arithmetic may be implemented with a binary arithmetic logic structure. Multiplier regularization may also include using N:N compression (e.g., 2:2 compression) to introduce gaps in the combination of partial products so that the ones and twos complement arithmetic of signed operations may be implemented in a minimum number of levels, and/or multiplier regularization may include any suitable combination of the techniques described above.

Figure 1:
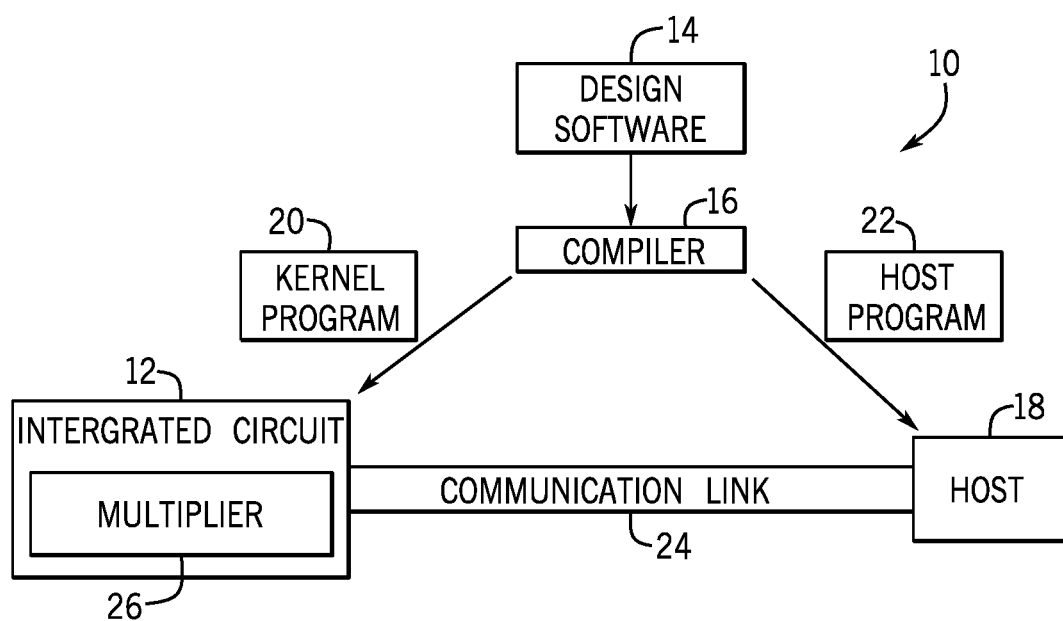
FIG. 1 is a block diagram of a system for implementing machine learning, in accordance with an embodiment.

With the foregoing in mind, FIG. 1 illustrates a block diagram of a system 10 that may implement machine learning techniques. A designer may desire to implement functionality, such as the hyperbolic functions of this disclosure, on an integrated circuit device 12 (IC, such as a field programmable gate array (FPGA)). The designer may specify a high-level program to be implemented, such as an OpenCL program, which may enable the designer to more efficiently and easily provide programming instructions to configure a set of programmable logic cells for the integrated circuit device 12 without requiring specific knowledge of low level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low level hardware description languages to implement new functionalities in the IC.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of a multiplier 26 on the integrated circuit device 12. The multiplier 26 may include circuitry and/or other logic elements and may be configured to implement, for example, machine learning operations.

Figure 2:
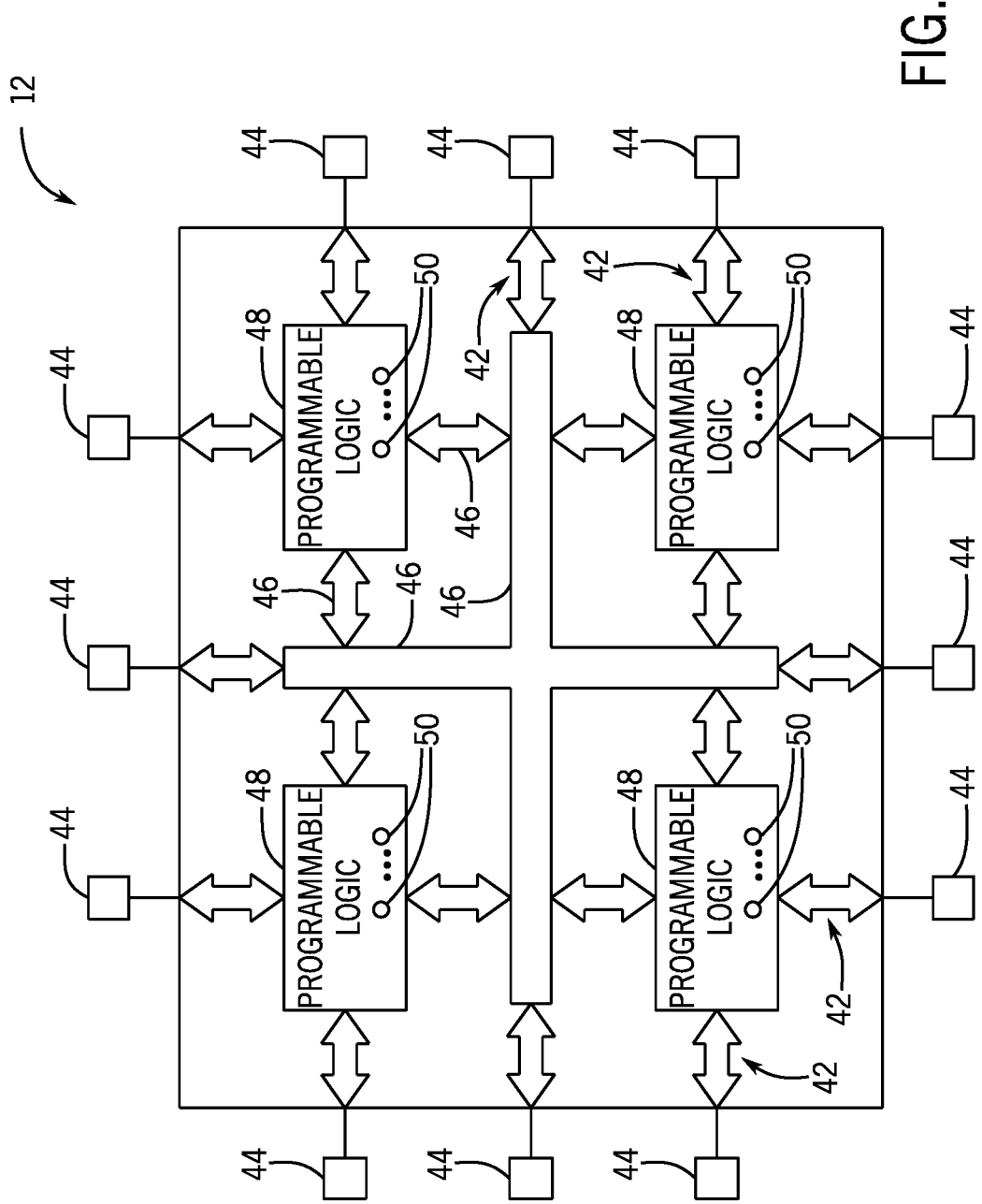
FIG. 2 is a block diagram of an integrated circuit where multipliers may be implemented, in accordance with an embodiment.

Turning now to a more detailed discussion of the integrated circuit device 12, FIG. 2 illustrates an integrated circuit device 12, which may be a programmable logic device, such as a field programmable gate array (FPGA). Further, it should be understood that the integrated circuit device 12 may be any other suitable type of programmable logic device (e.g., an application-specific integrated circuit and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Modern integrated circuit devices 12, such as FPGAs, typically have a dedicated adder structure, which may be in some form of a ripple-carry adder and may be used by a multiplier (e.g., multiplier 26), supported in logic. Look up tables (LUTs), which may implement different logic operations, may feed each node of the ripple-carry adder. However, there may be a limited number of independent inputs for each LUT in a local group of logic.

As an example, groups often arithmetic logic modules (ALMs) may be arranged together in a structure known as a logic array block (LAB). Each ALM may be decomposed into an arithmetic mode, where four, four-input LUTs may feed two bits of a ripple-carry adder. These four LUTs may share six independent inputs in a specified way, as an integrated circuit device 12 may not include sufficient area to map four independent inputs to each of the four LUTs (e.g., sixteen independent inputs in total). Accordingly, each LAB may have a total number of independent inputs that is less than the number of inputs available per ALM. Therefore, as a large number of common inputs may be shared across ALMs, careful routing of these common inputs within the integrated circuit device 12 may reduce resources, such as wiring and area, involved with performing arithmetic operations on the inputs.

In some embodiments, the multiplier 26 of the integrated circuit device 12 may use ALMs to perform multiplication, in order to implement machine learning techniques. Further, in some embodiments, in order to increase efficiency, reduce resources (e.g., wiring, area, and/or the like), and/or reduce latency associated with the computation and/or implementation of the multiplication, the multiplier 26 may be regularized (e.g., refactored) according to described herein.

A 3×3 multiplier (e.g., a multiplier configured to multiply a 3-bit multiplicand by a 3-bit multiplier) may generate a number of partial products in order to determine a product of the inputs it receives. For example, as illustrated in the multiplier table 250 of FIG. 3, the 3×3 multiplier may generate and align a first partial product PP0 ({0, 0, AF, BF, CF}), a second partial product PP1 ({0, 0, 0, AE, BE, CE, 0}), and a third partial product PP2 ({0, AD, BD, CD, 0, 0}) during multiplication operations of a first 3-bit input ({A, B, C}) with a second 3-bit input ({D, E, F}). Each column (e.g., Column 0, Column 1, Column 2, Column 3, Column 4, and Column 5) in the multiplier table 250 may represent a bit position. Further, each entry in the multiplier table 250 (e.g., AF, BF, CF, AE, BE, CE, AD, BD, and CD) may represent a single bit resulting from the logical AND (e.g., bit-wise multiplication) of two respective bits (e.g., A AND F, B AND F, C AND F, A AND E, B AND E, C AND E, A AND D, B AND D, C AND D, respectively). Accordingly, to generate the product of the first 3-bit input and the second 3-bit input, the 3×3 multiplier may sum the three partial products (PP0, PP1, and PP2) together.

However, ternary summation that involves summing three inputs with a ternary adder may result in an increased use of resources (e.g., wiring), area, and/or power in the integrated circuit device 12. As such, ternary summation may be an expensive operation and/or may be unsupported by certain integrated circuit devices 12 and/or by certain FPGAs. Accordingly, in place of ternary summation, three inputs may be summed over two levels of binary summation (e.g., two carry chains), as illustrated in FIG. 4.

Figure 3:
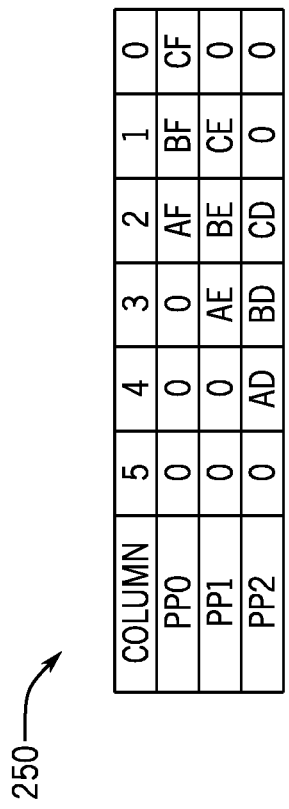
FIG. 3 is a table mapping partial product generation and alignment for a 3×3 multiplier, in accordance with an embodiment.
Figure 4:
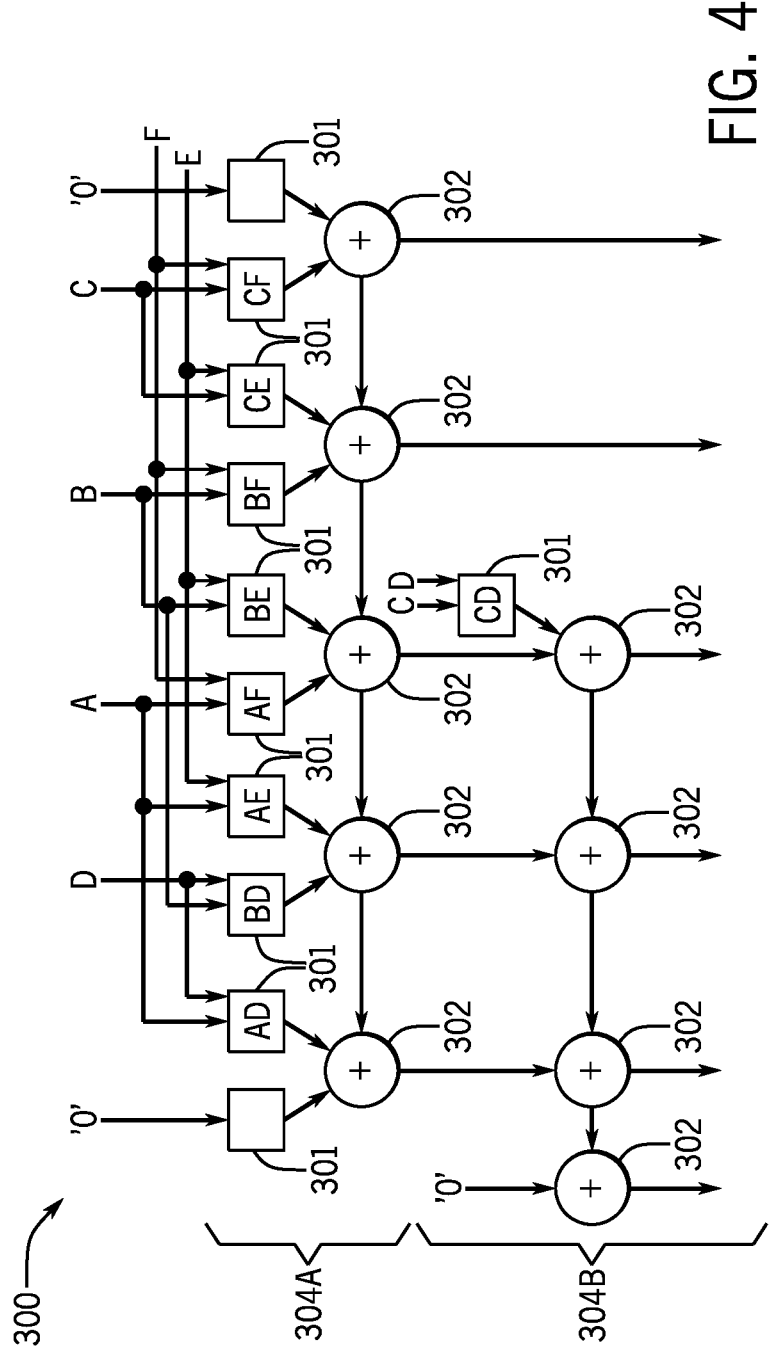
FIG. 4 is a block diagram of a 3×3 multiplier, in accordance with an embodiment.

FIG. 4 illustrates a mapping of the first 3-bit input and the second 3-bit input described above to a 3×3 multiplier 300. The 3×3 multiplier 300 may include a number of look up tables (LUTs) 301 that may generate the bits resulting from the logical AND of two respective bits (e.g., inputs to the LUT 301). Accordingly, each of the input bits (e.g., A-F) included in the first 3-bit input and the second 3-bit input may map to a suitable set of LUTs 301 to facilitate bit-wise multiplication of the first 3-bit input and the second 3-bit input. Further, each LUT 301 may output the result of its bit-wise multiplication to a ripple-carry adder 302 associated with the respective LUT 301. A first group of the ripple-carry adders 302 may form a first carry chain 304A, and a second group of the ripple-carry adders 302 may form a second carry chain 304B. The position of the ripple-carry adder 302 associated with a respective LUT 301 may determine the bit position of the sum of the output of the respective LUT 301 and another input (e.g., the output of an additional LUT 301) to the ripple-carry adder 302. That is, for example, the right-most ripple-carry adder 302 may receive the output of a LUT 301 that generates CD and '0' (e.g., no input) as inputs and may sum these inputs to generate the zeroth bit position of the product, which corresponds to Column 0 in FIG. 3.

Further, while the multiplier table 250 illustrates three partial products (PP0, PP1, PP2), the illustrated 3×3 multiplier 300 is implemented to generate a first partial product with the first carry chain 304 and a second partial product with a second carry chain 304B. Referring back to the multiplier table 250, excluding Column 2, each of the columns (e.g., Column 0, Column 1, Column 2, Column 3, and Column 4) summing one or more entries may be reduced from three entries to two or from two entries to one by removing entries whose value is zero (e.g., '0'). Accordingly, by suitably arranging the multiplier inputs, the 3×3 multiplier 300 may reduce the multiplication operation to two partial products.

Further, because the ripple-carry adders 302 may be binary ripple-carry adders 302 each of the summations of the entries within Column 0, Column 1, Column 2, Column 3, and Column 4 may be handled in a single carry chain (e.g., the first carry chain 304). However, because Column 2 (e.g., the third bit position) may contain three non-zero entries, addition of a third entry (e.g., CD) in Column 2 with the sum of the other entries in Column 2 (e.g., AF and BE) generated in the first carry chain 304 may be handled with an additional ripple-carry adder 302. Further, because this addition operation may result in a carry, the third entry may be added to the first partial product resulting from the first carry chain 304 by implementing the second carry chain 304B. Accordingly, the second carry chain 304B may add four ripple-carry adders 302 to the multiplier 300 in order to handle the summation of the three entries of Column 2. As such, summing three inputs over two levels of binary summation (e.g., with the first carry chain 304A and the second carry chain 304B) may be resource intensive to the integrated circuit device 12.

Figure 5:
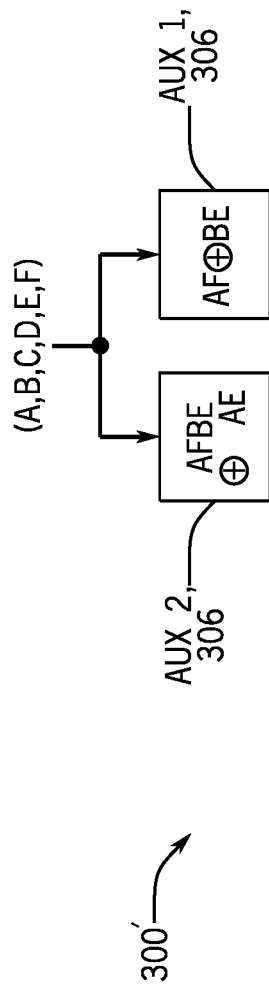
FIG. 5 is a table mapping refactored partial product generation and alignment for a 3×3 multiplier, in accordance with an embodiment.

Thus, to reduce the resources (e.g., routing wire, area, and/or power) involved with handling the summation of three inputs in a multiplier (e.g., 3×3 multiplier 300), redundant form arithmetic (e.g., 3:2 compression, 2:2 compression, and/or the like) may be implemented. That is, the arithmetic of combining the three entries may be refactored with combinatorial functions implemented by auxiliary cells (e.g., common preprocessing cells), as the multiplier table 350 of FIG. 5 illustrates. In some embodiments, for example, AF and BE may be extracted into a first auxiliary cell ($AUX_1$) configured to generate a redundant sum of AF and BE using the exclusive OR (⊕) function (AF⊕BE), which may be re-expressed as ((A AND F)⊕(B AND E)). The same 4 inputs (A, F, B, and E) may then be used in the same ALM to calculate a redundant carry (AF AND BE), which is the majority of the 4 inputs and may be re-expressed as (A AND F AND B AND E). The redundant carry may carry into Column 3, resulting in three entries (AE, BD, and the redundant carry) in the column.

Accordingly, a second redundant sum may compress entries in column three. In some embodiments, for example, a second auxiliary cell ($AUX_2$) may generate the second redundant sum by taking the exclusive OR of the redundant carry and one of other entries in Column 3, such as AE, resulting in ((A AND F AND B AND E)⊕(A AND E)). Further, in such cases, the second redundant carry resulting from the compression of the redundant carry and AE may be represented as ((A AND F AND B AND E) AND (A AND E)), which may be re-expressed as (A AND F AND B AND E). However, to avoid creating an additional auxiliary cell, the second redundant sum may be exclusive ORed with AE as an entry in Column 4, which generates ((A AND F AND B AND E)⊕(A AND E)⊕(A AND E). This expression may be re-expressed as (A AND F AND B AND E), which corresponds to the second redundant carry. Accordingly, the contribution of the second redundant carry may be generated in Column 4 by taking the exclusive OR of the result of the second auxiliary cell and AE ($AUX_2 \oplus AE$).

Thus, according to the techniques described above, FIG. 6 illustrates a mapping of the first 3-bit input and the second 3-bit input to a restructured (e.g., regularized) 3×3 multiplier 300'. The restructured 3×3 multiplier 300' may include a single carry chain 304, which may include each of a number of LUTs 301 mapped to a respective ripple-carry adder 302, a first auxiliary cell ($AUX_1$) 306, and a second auxiliary cell ($AUX_2$) 306. As illustrated, $AUX_1$ 306 and $AUX_2$ 306 may not form part of the carry chain 304 associated with soft logic (e.g., LUTs 301), and as such $AUX_1$ 306 and $AUX_2$ 306 may be denoted as being out of band. Further, as described above, $AUX_1$ 306 may handle 3:2 compression of partial product entries in the third bit position (e.g., Column 2), and $AUX_2$ 306 may handle 3:2 compression of partial product entries in the fourth bit position (e.g., Column 3). Accordingly, the output of $AUX_1$ 306 and $AUX_2$ 306 may route to a ripple-carry adder 302 in the third bit position and the fourth bit position, respectively. Additionally or alternatively, as illustrated, in some embodiments, the outputs may each map to a respective LUT 301 that feeds the output of $AUX_1$ 306 and $AUX_2$ 306, into the respective ripple-carry adder 302. Further, due to a possible carry, the output of $AUX_2$ 306 may also route to a LUT 301, which may perform the logic operation $AUX_2 \oplus AE$ described above to facilitate the second redundant carry.

Figure 6:
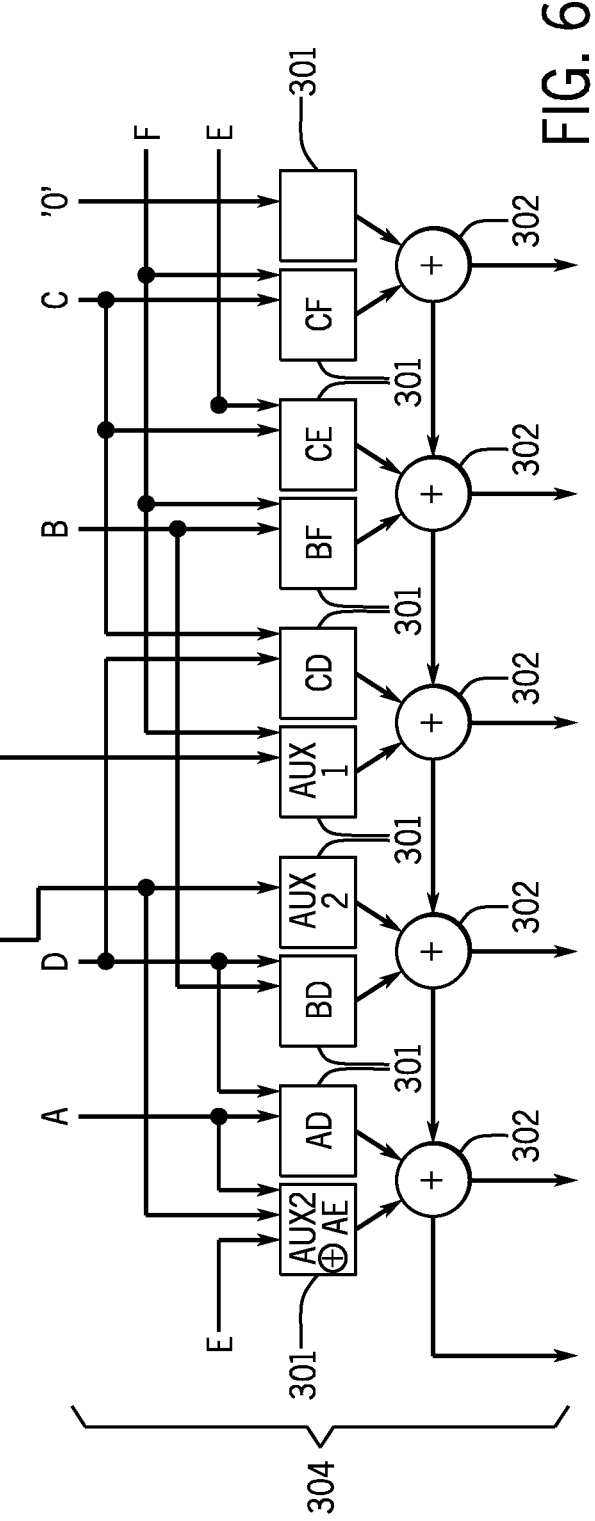
FIG. 6 is a block diagram of a 3×3 multiplier structured according to the mapping of FIG. 5, in accordance with an embodiment.

Accordingly, with reference to FIG. 4 and FIG. 6, an unsigned 3×3 multiplier (e.g., restructured 3×3 multiplier 300') may be reduced to four ALMs, and a summation of three entries may be reduced from two levels of binary summation (e.g., the first carry chain 304A and the second carry chain 304B) to a single level of binary summation (e.g., the single carry chain 304). Three of the four ALMs may be used in an unbroken carry chain (e.g., carry chain 304), and one of the four ALMs may handle the two auxiliary cells 306. Further, by grouping each pair of columns in the carry chain 304 into an ALM, it can be shown that a maximum of four inputs are received per ALM and that a total of six independent inputs are used over the four ALMs. Accordingly, this restructured 3×3 multiplier 300' may benefit from a low stress system routing implementation. As a result, this restructured 3×3 multiplier 300' may fit into the integrated circuit device 12 with high density, while maintaining high speed.

Further, the techniques described herein with respect to the 3×3 multiplier may be expanded for use with any suitably sized multiplier. In some embodiments, for example, larger multipliers where an odd number of partial products exist (e.g., a 5×5 multiplier, a 7×7 multiplier, and/or the like) may implement the techniques described above. Accordingly, FIG. 7 illustrates a multiplier table 450, which includes the partial products of a 5×5 multiplier. For simplicity, each partial product bit is represented with a single letter (omitting the letter 'O' to avoid confusion with the number '0'), rather than displaying the ANDing of the two bits that generated the partial product bit, as shown in FIGS. 3 and 5 for the 3×3 multiplier.

Since an even number of partial products may create a balanced first level addition of partial products and may save resources, especially if an even number of partial products may be created by removing one of the initial partial products, the partial products of the 5×5 multiplier may be decomposed (e.g., rearranged) into two sets of partial products, as FIG. 8 and FIG. 9 demonstrate. To do so, the partial product bits K and L may be moved into Column 6 and Column 5, respectively, of the first partial product PP0 of the multiplier table 500, partial product bit P may be moved into Column 2 of the fourth partial product PP3 in multiplier table 550, and partial product bit N may be moved into Column 3 of the fifth partial product PP4 in the multiplier table 550. As a result, the first set of partial products (e.g., PP0, PP1, and PP2) included in the multiplier table 500 may include two partial products (e.g., PP0, PP1) and a single column (e.g., Column 4) with an additional partial product bit (e.g., M), and the second set of partial products included in the multiplier table 550 may include two partial products (e.g., PP3 and PP4).

Accordingly, to combine the three partial product bits (A, G, and M) in Column 4 of the multiplier table 500, 3:2 compression may be implemented. As such, as the multiplier table 600 of FIG. 10 demonstrates, in some embodiments, a first auxiliary cell ($AUX_1$) 306 may generate a first redundant sum by taking the exclusive OR of G and M (G⊕M), and a second auxiliary cell ($AUX_2$) 306 may generate the first redundant carry in Column 5 and compress it with F ((G AND M)⊕F). A third auxiliary cell ($AUX_3$) 306 may then generate the second redundant carry (G AND M AND F), resulting from the operations in Column 5, in Column 6. However, while this implementation of three auxiliary cells 306 may reduce the first set of partial products to two partial products (e.g., by eliminating the presence of 3 partial products in any column), three auxiliary cells 306 may not fit into a single ALM.

If the multiplicand input to the 5×5 multiplier is represented as A[4:0] and the multiplier input to the 5×5 multiplier is represented as B[4:0], G may represent (A[3] AND B[1]), M may represent (A[2] AND B[2]), and F may represent (A[4] AND B[1]). Thus, $AUX_3$ 306 may evaluate a function with five independent variables (e.g., A[4], A[3], A[2], B[1], and B[2]) As a result, the function evaluated by $AUX_3$ 306 may not be reduced or re-expressed into a form that eliminates the third auxiliary cell 306, as the refactoring described with respect to the second redundant carry in restructured 3×3 multiplier 300' accomplishes.

As such, in some embodiments, to reduce the resources (e.g., the number of ALMs) involved in determining a product of the 5×5 multiplier, $AUX_2$ 306 may generate the first redundant carry (G AND M) in Column 5 and compress it with L, removing F from the function. As such, the second redundant sum generated by $AUX_2$ 306 may be represented as ((G AND M)⊕L), and because L may be represented as (A[3] AND B[2]) in terms of the multiplicand A[4:0] and the multiplier B[4:0], the second redundant sum may be re-expressed as (((A[3] AND B[1]) AND (A[2] AND B[2]))⊕ (A[3] AND B[2])). Further, with L involved in the compression of Column 5, the second redundant carry may be represented as (G AND M AND L), which may be re-expressed as (A[3] AND B[1] AND A[2] AND B[2] AND A[3] AND B[2]), which reduces to (A[3] AND A[2] AND B[2] AND B[1]). With four independent variables (A[3], A[2], B[2], and B[1]) included in the second redundant carry, the second redundant carry may be generated in Column 6 by taking the exclusive OR of the second redundant sum generated by $AUX_2$ 306 and L (((A[3] AND B[1]) AND (A[2] AND B[2]))⊕(A[3] AND B[2]) (A[3] AND B[2])). Thus, as the multiplier table 650 of FIG. 11 shows, the first set of partial products may be reduced to two partial products with two auxiliary cells 306, eliminating the third auxiliary cell 306 described in the implementation above.

With two partial products in both the first set of partial products (e.g., PP0 and PP1) and in the second set of partial products (e.g., PP3 and PP4), a set of binary adders may cheaply sum all of the partial products into a final product. In some embodiments, for example, a first binary adder may add the first set of partial products to generate a first sum, a second binary adder may add the second set of partial products to generate a second sum, and a third binary adder may add the first sum and the second sum to generate the product of the 5×5 multiplier for the given multiplicand and multiplier.

As described above, to generate a product, the partial products generated by a multiplier may be summed. In some embodiments, a binary ripple-carry adder may efficiently add the partial products. As a binary ripple-carry adder may receive two inputs, the two partial product sets each containing a pair of partial products, as described with reference to the 5×5 multiplier, may cheaply be summed. However, in some cases, such as those where a multiplier produces a non-binary number of sets (e.g., pairs) of partial products, logic in front of one or more ripple-carry adders may be used to further optimize the final summations used to generate the product. In particular, using the logic in front of a binary ripple-carry adder, the binary ripple-carry adder may sum three partial products with a small number of auxiliary cells 306.

As an illustrative example, a 6×6 multiplier may be implemented in two levels of logic. The first level of logic may handle generate the partial products (e.g., PP0, PP1, PP2, PP3, PP4, and PP5) illustrated in the multiplier table 700 of FIG. 12. These partial products may be added pairwise by a ripple-carry adder associated with each pair, which may result in three partial products (e.g., PP0+PP1, PP2+PP3, and PP4+PP5), as illustrated in the multiplier table 750 of FIG. 13. Accordingly, to generate the product of the 6×6 multiplier, a ternary set of partial products (e.g., PP0+PP1, PP2+PP3, and PP4+PP5) may be summed in the second level of logic.

Turning to multiplier table 750, each of the entries (e.g., XL, X1, X2, X3, X4, X5, X6, X7, YL, Y1, Y2, Y3, Y4, Y5, Y6, Y7, ZL, Z1, Z2, Z3, Z4, Z5, Z6, and Z7) for the partial products (PP0+PP1, PP2+PP3, and PP4+PP5, respectively) may represent a single bit resulting from the completed pairwise summations of the partial products of multiplier table 700 (e.g., A+B, C+D, and E+F, respectively). That is, the entries included in multiplier table 750 may represent summations that are already computed, and as each entry is a single bit, the summation of the partial products in multiplier table 750 may benefit from increased flexibility and routing options. Further, the least significant bit (LSB) of each partial product (PP0+PP1, PP2+PP3, and PP4+PP5) is denoted with an 'L' suffix in multiplier table 750 to indicate that these may be logic calculated and may not have to go through the ripple-carry adder 302.

The entries in multiplier table 750 may be rearranged without impacting the value of the product in order to produce multiplier table 800 of FIG. 14. To do so, Z7, Z6, Z5, Z4 may be shifted into Column 11, Column 10, Column 9, and Column 8, respectively, of the first partial product (PP0+PP1). With this arrangement of partial product bits, it is clear that four columns (e.g., Columns 4-7) contain three entries, and as discussed above, ternary addition of these entries may cause routing stress on the integrated circuit device 12.

Figure 15:
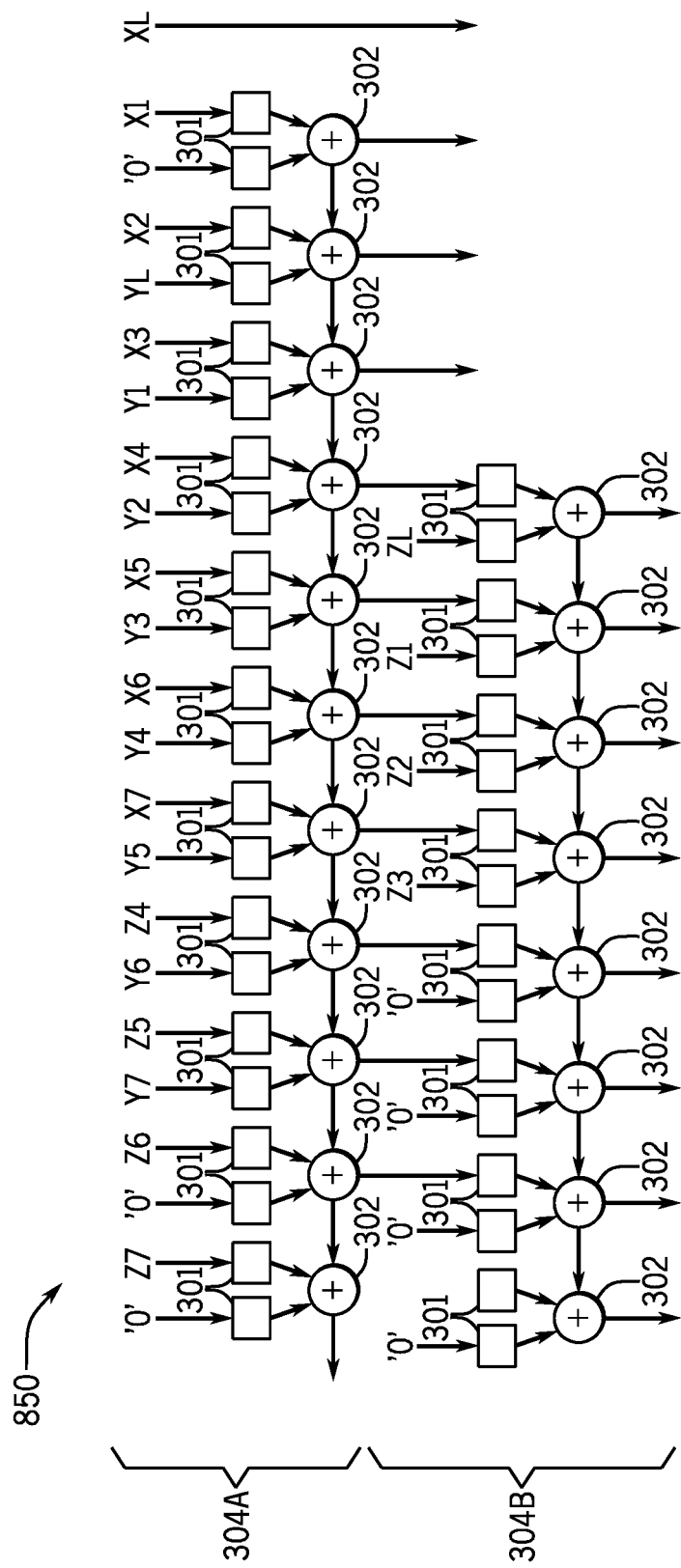
FIG. 15 is a block diagram of a 6×6 multiplier structured according to the mapping of FIG. 14, in accordance with an embodiment.

As an illustrative example, FIG. 15 illustrates a mapping, as described above, of the entries of multiplier table 800 to a portion of a 6×6 multiplier 850. Accordingly, as described with reference to FIG. 4, the summations for columns (e.g., bit positions) with three non-zero entries (e.g., Column 7, Column 6, Column 5, and Column 4) may be handled with a second carry chain 304B. However, with this portion of the 6×6 multiplier 850, adding a second carry chain 304B may be even more costly than as described herein with reference to the 3×3 multiplier 300. While the resource stress incurred by the second carry chain 304B in FIG. 4 may result from the addition of four ripple-carry adders 302, in the case of the 6×6 multiplier 850, the resource stress incurred by the second carry chain 304B may result from the addition of eight ripple-carry adders 302.

Accordingly, to reduce a ternary addition operation to a single level of a binary addition operation, a portion of ripple-carry adder logic may be supplemented by one or more auxiliary cells 306, which may implement a combination of 3:2 and 2:2 redundant form compression. Thus, with reference to multiplier table 800 and multiplier table 900 of FIG. 16, ripple-carry adder logic may use 3:2 redundant form compression on the partial product bits in Column 4 (e.g., X4, Y2, and ZL) to generate a first redundant sum (S1), which may be expressed as (X4⊕Y2⊕ZL). Additional ripple-carry adder logic may then generate the first redundant carry (C1) by taking the majority of X4, Y2, and ZL, or Majority(X4, Y2, ZL), which may be re-expressed as ((X4 AND Y2) OR (X4 AND ZL) OR (Y2 AND ZL)), in Column 5.

With the first redundant carry generated, Column 5 may contain four entries (e.g., C1, X5, Y3, and Z1). Since the additional ripple-carry adder logic may be used to generate the first redundant carry, a first auxiliary cell 306 may use 3:2 redundant form compression on the original partial product bits in Column 5 (e.g., X5, Y3, and Z1) to generate a second redundant sum (HS1). A second auxiliary cell 306 may then generate the second redundant carry (HC1) corresponding to the 3:2 redundant form compression of X5, Y3, and Z1, which may be expressed as (Majority(X5, Y3, and Z1)). The second auxiliary cell 306 may generate the second redundant carry because, as described above with reference to Column 5, Column 6 may contain 4 entries (e.g., X6, Y4, Z2, and HC1) with the generation of the second redundant carry. Accordingly, ripple-carry adder logic may handle the 3:2 redundant form compression of the original partial product bits (e.g., X6, Y4, and Z2) in Column 6. As such, the ripple-carry adder logic may generate a third redundant sum (S2) in Column 6, which may be expressed as (X6⊕Y4⊕Z2).

Accordingly, in some embodiments, as described above, because the integrated circuit device 12 may contain a limited number of independent routing paths and/or inputs to the ripple-carry adder logic and/or because the ripple-carry adder logic may not have the capability to perform each of the compression tasks (e.g., the generation of each redundant sum and/or redundant carry), one or more auxiliary cells 306 may generate a redundant sum (e.g., HS1) and/or a redundant carry (e.g., HC1). In some cases, for example, auxiliary cells 306 and ripple-carry adder logic may alternate between generating each set of redundant sum and redundant carry, which is described above with reference to the generation of S1 and C1 versus the generation of HS1 and HC1.

In Column 7, additional ripple-carry adder logic may then generate a third redundant carry (C2) that is associated with the 3:2 redundant form compression of the original partial product bits (e.g., X6, Y4, and Z2) in Column 6 and may be expressed as Majority(X6, Y4, Z2). Additionally, a third auxiliary cell 306 may reduce the partial product bits in Column 7 (e.g., X7, Y5, and Z3) to a fourth redundant sum (HS2), which may be represented as (X7⊕Y5⊕Z3).

In Column 8, a fourth auxiliary cell 306 may generate the fourth redundant carry (HC2) that is associated with the fourth redundant sum and may be expressed as Majority(X7, Y5, Z3). Further, as Column 8 may contain two partial product bits (e.g., Z4 and Y6), ripple-carry adder logic may use 2:2 redundant form compression to generate a fifth redundant sum (S3), which may be expressed as (Z4⊕Y6). Ripple-carry adder logic may then generate the fifth redundant carry (C3), which may be expressed as (Z4 AND Y6), in Column 9 to complete the 2:2 redundant form compression of the two partial product bits (e.g., Z4 and Y6) from Column 8.

Additionally, Column 9 may include ripple-carry adder logic to generate a sixth redundant sum (S4) of the partial product bits (e.g., Z5 and Y7) included in the column. The sixth redundant sum may be expressed as (Z5⊕Y7), according to 2:2 redundant form compression of the bits. Accordingly, ripple-carry adder logic may generate the sixth redundant carry (C4) in Column 10, and because Column 10 may contain two entries (e.g., Z6 and C4) with the generation of the sixth redundant carry, a binary ripple-carry adder may handle the summation of the entries without additional logic or auxiliary cells 306.

Further, when summing the partial products included in multiplier table 900, the least significant bits (e.g., XL and X1) may form a portion of the sum without requiring addition (e.g., additional logic), and overflow from the most significant bit (Z7) position may be possible. Thus, according to the logic and alignment of partial product bits, redundant sums, and redundant carries included in multiplier table 900, the product of the partial products may be determined with an 11-bit ripple-carry adder, which may accommodate a sum generated from Column 2-11 and 1-bit overflow.

Figure 17:
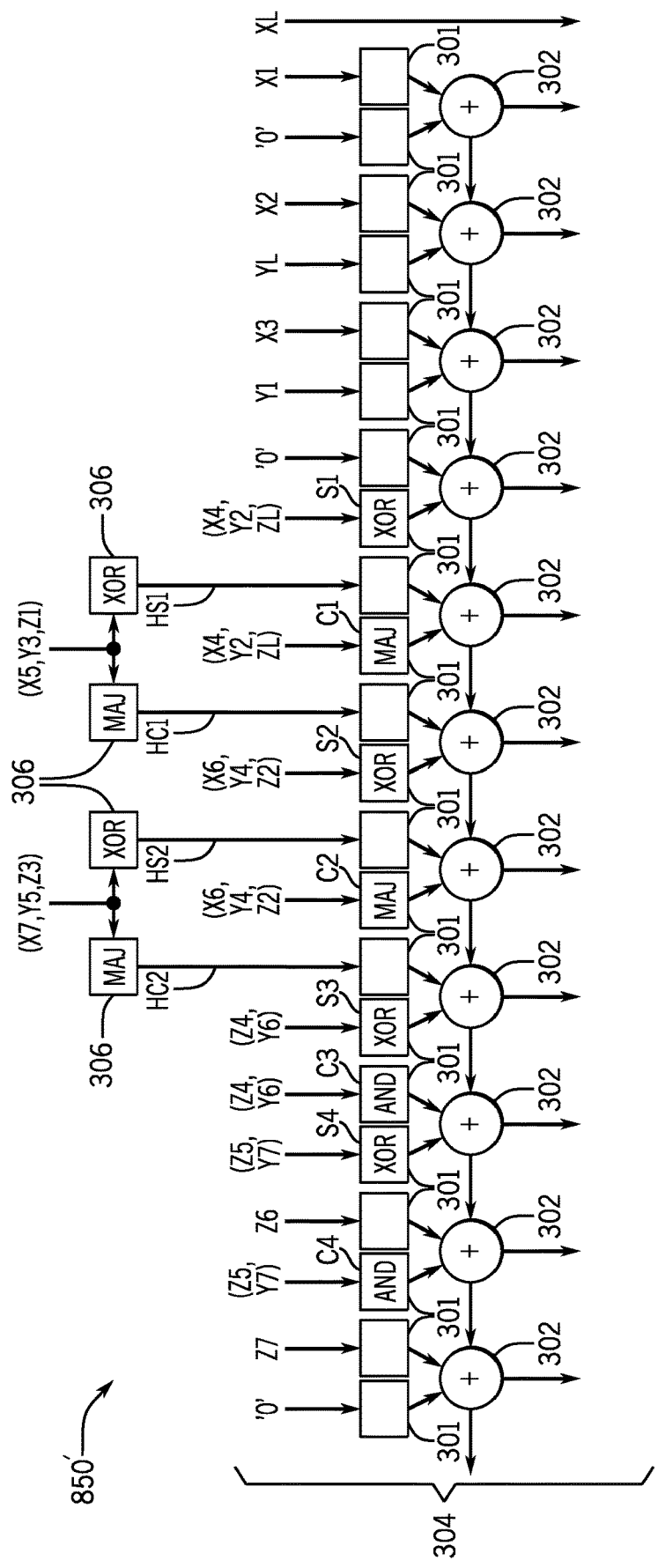
FIG. 17 is a block diagram of a 6×6 multiplier structured according to the mapping of FIG. 16, in accordance with an embodiment.

Turning to FIG. 17, the techniques described with reference to multiplier table 900 may be implemented in a restructured (e.g., regularized) portion of a 6×6 multiplier 850'. Accordingly, the restructured portion of the 6×6 multiplier 850' may contain a single carry chain 304, which may include 11 ripple-carry adders 302 to accommodate up to an 11-bit product. Further, as discussed herein, the LSB (e.g., XL) may map directly to the zeroth bit position of the product.

To reduce the ternary addition operations, ripple-carry adder logic (e.g., S1, C1, S2, C2, S3, C3, S4, and C4) and auxiliary cells 306 (e.g., HS1, HC1, HS2, and HC2) may be associated with the carry chain 304. Accordingly, combinatorial functions, such as exclusive OR and the majority function (Maj.) may be implemented in the restructured portion of the 6×6 multiplier 850'. More specifically, as described in greater detail above, ripple-carry adder logic associated with the ripple-carry adder 302 whose output corresponds to the fourth bit position in the product may generate S1 from the inputs X4, Y2, and ZL. The first redundant carry (C1) (e.g., Majority(X4, Y2, ZL) resulting from the 3:2 compression used to generate the first redundant sum (S1) may be handled, using the same inputs, in ripple-carry adder logic associated with the ripple-carry adder 304 in the fifth bit position. Accordingly, because ripple-carry adder logic associated with the ripple-carry adder 304 in the fifth bit position may be used to generate C1, a first and second auxiliary cell 306 both receiving X5, Y3, and Z1 as inputs may respectively generate HS1 and HC1 for the fifth and sixth bit position. As such, the ripple-carry adder logic associated with the ripple-carry adder in the sixth bit position may be available to generate S2 from X6, Y4, and Z2, and following the pattern of redundant sum and redundant carry generation just described, C2 may be generated by the ripple-carry adder logic associated with the ripple-carry adder in the seventh bit position. To that end, a third and a fourth auxiliary cell 306 both receiving X7, Y5, and Z3 may respectively generate HS2 and HC2 for the seventh and eighth bit position. The ripple-carry adder logic associated with the ripple-carry adder in the eighth bit position may generate S3 from the inputs Z4 and Y6, according to 2:2 compression. Accordingly, the ripple-carry adder logic associated with the ripple-carry adder in the ninth bit position may generate C3 with the same input. Additionally, this ripple-carry adder logic may generate S4 using 2:2 compression of Z5 and Y7. Finally, the ripple-carry adder logic associated with the ripple-carry adder in the tenth bit position may generate C4 from the same inputs, resulting in the reduction of ternary addition operations to single level binary operations within the restructured portion of the 6×6 multiplier 850'.

While the techniques described above reference a 6×6 multiplier (e.g., the restructured portion of the 6×6 multiplier 850'), in some embodiments, they may be extended for use as a part of an adder tree involved with larger, smaller, or any suitable size multipliers. For example, when there are five partial products, such as generated by an N×10 multiplier, three of the partial products may be added with these techniques, and the remaining two may be added with a binary adder. The final result may then be added by a binary adder. Further, while the auxiliary cells 306 (e.g., HS1, HC1, HS2, and HC2) are described as performing redundant form compression on a specific set of partial product entries, any suitable combination of logic handled by the auxiliary cells 306 and/or the logic (e.g., LUTs 301) associated with the ripple-carry adders 302 may be implemented.

In some embodiments, the partial products included in multiplier table 900 may be reduced further. With reference now to multiplier table 900 and multiplier table 1000 of FIG. 18, ripple-carry adder logic may compress the partial product bits in Column 2 (e.g., X2 and YL) according to 2:2 redundant compression form to generate a redundant sum (SL1), which may be expressed as (X2⊕YL) in Column 2. Additional ripple-carry adder logic may then generate the associated redundant carry (CL1), which may be expressed as (X2 AND YL) in Column 3. Further, the additional ripple-carry adder logic may compress the partial product bits in Column 3 (e.g., X3 and Y1) by generating an additional redundant sum (SL2) so that Column 3 contains two entries (e.g., SLB and CLA). As such, ripple-carry adder logic may generate the associated additional redundant carry (CL2) in Column 4, along with the first redundant sum (S1), as described above.

Accordingly, Column 2 may include a single entry. Thus, as described above with reference to the least significant bits (e.g., X1 and XL), the entry in Column 2 may be added combinatorically to the sum of the partial products. As such, the contribution of the entry from Column 2 may be dissociated from the carry chain, and a 10-bit ripple-carry adder may sum the remaining partial product contributions (e.g., the entries in Columns 2 -11).

In some embodiments, the techniques described above to further reduce the partial products may increase system speed and/or improve packing of the multiplier into the integrated circuit device 12, as the carry chain is shortened. However, in some cases, these benefits may not be as apparent.

By mapping each pair of columns to an ALM, it is clear that the maximum number of independent inputs of an ALM would exist where a full pair of 3:2 compressors are implemented in logic. For example, one ALM may contain {S1, $CL_2$, HS1, C1}, or {X4⊕Y2⊕ZL, X3 AND Y1, HS1, Majority(X4, Y2, ZL)} from multiplier table 1000. Thus, the independent inputs to the ALM are X4, Y2, ZL, X3, Y1, and HS1. To handle these independent inputs the ALM may contain fully independent inputs to both ripple-carry adder bits. However, in a more typical integrated circuit device 12 and/or FPGA, CL2 (e.g., X3 AND Y1) may be calculated externally in an auxiliary cell 306 to facilitate mapping of the inputs to the actual LUT routing in the ALM. In such cases, the use of the additional resources (e.g., the auxiliary cell 306) may reduce the benefits of the 2:2 compression of Column 2 and Column 3; though, in some cases this implementation may be beneficial in terms of placement opportunities.

Returning to multiplier table 900, the benefits of further reducing the carry chain are more apparent. In multiplier table 900, the most densely routed ALM may include {S2, HC1, C2, HS2}, or {X6⊕Y4⊕Z2, HC1, Majority(X6, Y4, Z2), HS2}. Although this ALM may receive five independent variables, the routing is mapped to the LUTs in the ALM may be supported, and as such, further reducing the carry chain may increase system speed and/or improve packing of the multiplier.

Turning now to multiplier table 1050 of FIG. 19, in the case of signed multiply, the partial products may be calculated by logically ANDing the multiplicand bits with respective multiplier bits, as described above with reference to unsigned multiplication. However, in the case of signed multiplies, a partial product may include one or more sign extension bits, as denoted by '( )' (e.g., 'A', 'E', 'I', and 'M'). Further, if the multiplier is a negative number (e.g., the MSB of the multiplier is a '1'), the last partial product may be negated before it is summed with the other partial products. In the case of the illustrated 4×4 signed multiplier, for example, the first three partial products (PP0, PP1, PP2) may be calculated without any additional negation step, and the fourth (e.g., last) partial product (e.g., PP3) may be negated if the multiplier is negative. To negate the last partial product (e.g., PP3), the bits of the multiplicand may be inverted and a '1' may be added to the LSB position (e.g., Column 3) of the last partial product. Yet, in cases such as the 4×4 signed multiplier partial products generated in Table 13, there may not be an obvious place to add the '1' bit to the LSB of the last partial product, as an additional adder may be used to sum the '1' to the bits included in Column 3 (e.g., a ternary addition operation).

Thus, a first approach to generating the product of a signed multiplier, such as the 4×4 signed multiplier, while avoiding wasting resources involved with utilizing the additional adder, may involve adding a first set of partial products normally and adding a second set of partial products using 2:2 redundant form compression. In the case of the 4×4 signed multiplier, for example, the first pair of partial products (e.g., PP0 and PP1) may be summed without additional logic, and the second pair of partial products (e.g., PP2 and PP3) may be summed with 2:2 compression in order to create a '0' in place of the partial product bit Q.

Accordingly, multiplier table 1100 of FIG. 20 may illustrate the 2:2 redundant form compression applied to the second set of partial products from the 4×4 signed multiplier before they are summed. In order to create a hole (e.g., '0') in place of the LSB of the last partial product (e.g., 'Q'), logic, such as ripple-carry adder logic, may generate a 2:2 redundant form compression of the partial product bits (e.g., K and Q) in Column 3. Accordingly, a first redundant sum (S1) of the partial product bits (e.g., K and Q) in Column 3 may be generated in Column 3 and may be expressed as (K⊕Q), and a corresponding first redundant carry (C1), which may be represented as (K AND Q) may be generated in Column 4. Further, Column 4 may contain a second redundant sum (S2) generated from 2:2 compression of the partial product bits in Column 4 (e.g., J and P) and may be represented as (J⊕P). The corresponding second redundant carry (C2), which may be expressed as (J AND P), may be generated in Column 5. Accordingly, a third redundant sum (S3) of the partial product bits in Column 5 may be represented as (I⊕N) and may be generated in Column 5 to avoid a ternary addition. The corresponding third redundant carry (C3) may then be generated in Column 6 and may be expressed as (I AND N). Column 6 may additionally include a fourth redundant sum (S4), which may be represented as ((I)⊕M). Further, Column 7 may include a sign extension of the fourth redundant sum ((S4)) and may include a fourth redundant carry (C4), which may be expressed as ((I) AND M) and may correspond to the fourth redundant sum.

Because the entries in Column 4 may be compressed into S1, the 'Comp' entry may represent a '0', or a hole, in the last partial product where the '1' bit used to negate the last partial product may be added in without using an additional adder. Further, while each entry in multiplier table 1050 may represent the logical AND of two bits, the distribution of the routing in the ALM may fully handle the routing of this compression pattern.

In a second approach to generate the product of a signed multiplier, a carry may be generated from Column 2 to feed into the rest of a ripple-carry adder. More specifically, for the second set of partial products, Column 2 does not have any entries to add with L. Accordingly to add a '1' to Q, a carry of a '1' may be forced from L. Because the value of L (e.g., either a 1 or a 0) is unknown and may not be changed, adding a '1' into Column 2 with L, as well as feeding a '1' carried in to L may keep the value output at the bit position of Column 2 equivalent to L (e.g., L is unchanged) and result in a '1' carried out to Q. This approach may be useful if other types of compression are used.

While the techniques described above reference a 4×4 signed multiplier, in some embodiments, they may be extended for use as a part of any suitably sized multipliers and/or with suitable unsigned multipliers. That is, examples described herein are intended to be illustrative, and not limiting.

Figure 21:
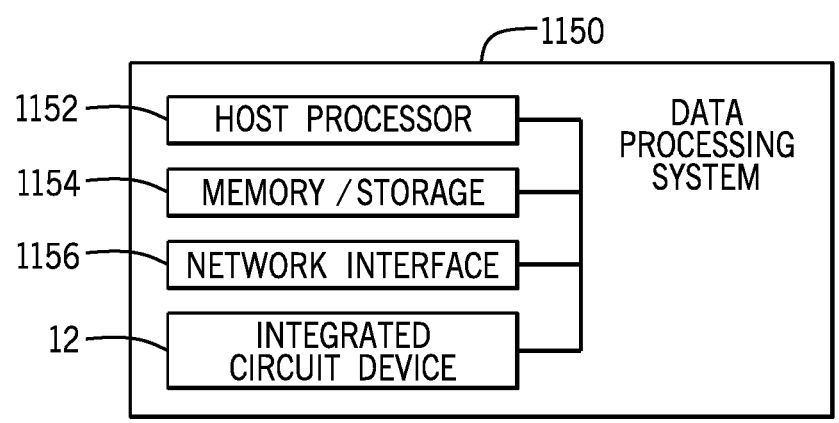
FIG. 21 is a block diagram of a data processing system, in accordance with an embodiment.

The integrated circuit device 12 may be, or may be a component of, a data processing system. For example, the integrated circuit device 12 may be a component of a data processing system 1150, shown in FIG. 21. The data processing system 1150 may include a host processor 1152, memory and/or storage circuitry 1154, and a network interface 1156. The data processing system 1150 may include more or fewer components (e.g., electronic display, user interface structures, application specific integrated circuits (ASICs)). The host processor 1152 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 1150 (e.g., to perform machine learning, video processing, voice recognition, image recognition, data compression, database search ranking, bioinformatics, network security pattern identification, spatial navigation, or the like). The memory and/or storage circuitry 1154 may include random access memory (RAM), read-only memory (ROM), one or more hard drives, flash memory, or the like. The memory and/or storage circuitry 1154 may hold data to be processed by the data processing system 1150. In some cases, the memory and/or storage circuitry 1154 may also store configuration programs (bitstreams) for programming the integrated circuit device 12. The network interface 1156 may allow the data processing system 1150 to communicate with other electronic devices. The data processing system 1150 may include several different packages or may be contained within a single package on a single package substrate.

In one example, the data processing system 1150 may be part of a data center that processes a variety of different requests. For instance, the data processing system 1150 may receive a data processing request via the network interface 1156 to perform machine learning, video processing, voice recognition, image recognition, data compression, database search ranking, bioinformatics, network security pattern identification, spatial navigation, or some other specialized task. The host processor 1152 may cause the programmable logic fabric of the integrated circuit device 12 to be programmed with a multiplier suitable to implement a requested task. For instance, the host processor 1152 may instruct that a configuration data (bitstream) stored on the memory and/or storage circuitry 1154 to be programmed into the programmable logic fabric of the integrated circuit device 12. The configuration data (bitstream) may represent a circuit design for a multiplier, which may be mapped to the programmable logic according to the techniques described herein, to efficiently perform and/or compute the requested task. By efficiently mapping (e.g., with multiplier regularization) the multiplier to the programmable logic, which may reduce routing and area resources used to perform the requested task, the integrated circuit device 12 may rapidly assist the data processing system 1150 in performing the requested task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Multiplier circuitry on an integrated circuit device, the multiplier circuitry comprising:
first input circuitry configured to receive a first input;
second input circuitry configured to receive a second input;
first combinatorial circuitry coupled to the first input circuitry and the second input circuitry and configured to generate, based at least in part on the first input and the second input, a first subset of two or more partial products, wherein the first combinatorial circuitry is configured to perform a combinatorial function to generate the first subset based at least in part on redundant form arithmetic; and
carry chain circuitry, comprising:
second combinatorial circuitry coupled to the first input circuitry and the second input circuitry and configured to generate, based at least in part on the first input and the second input, a second subset of the two or more partial products; and
one or more binary ripple-carry adders coupled to the second combinatorial circuitry, wherein the one or more binary ripple-carry adders are configured to generate a product based at least in part on the first subset and the second subset;
wherein one or both of the second combinatorial circuitry or the one or more binary ripple-carry adders are configured to receive the first subset from the first combinatorial circuitry.

2. The multiplier circuitry of claim 1, wherein the combinatorial function comprises one or both of an exclusive OR function or a majority function.

3. The multiplier circuitry of claim 1, wherein the second combinatorial circuitry is configured to receive the first subset, wherein the second combinatorial circuitry is configured to generate the second subset based at least in part on the first input, the second input, and the first subset.

4. The multiplier circuitry of claim 1, wherein one or both of the first combinatorial circuitry or the second combinatorial circuitry comprise a look up table.

5. The multiplier circuitry of claim 1, wherein the one or more binary ripple-carry adders are configured to sum the first subset with the second subset, wherein summing the first subset and the second subset provides a result equivalent to a ternary addition.

6. The multiplier circuitry of claim 1, wherein the first combinatorial circuitry is configured to perform one or both of 2:2 compression or 3:2 compression.

7. The multiplier circuitry of claim 1, wherein the first combinatorial circuitry is configured to introduce an arithmetic zero in one or more bit positions of the first subset.

8. The multiplier circuitry of claim 1, wherein the first combinatorial circuitry is out of band with the carry chain circuitry.

9. The multiplier circuitry of claim 1, wherein the second combinatorial circuitry is configured to generate the second subset using a second combinatorial function based at least in part on the redundant form arithmetic.

10. The multiplier circuitry of claim 1, wherein the multiplier circuitry comprises a soft multiplier.

11. The multiplier circuitry of claim 1, wherein at least one of the two or more partial products comprises a sum of a first partial product and a second partial product.

12. The multiplier circuitry of claim 1, wherein the integrated circuit device comprises a field-programmable gate array.

13. Multiplier circuitry on an integrated circuit device, the multiplier circuitry comprising:
first input circuitry configured to receive a first input having a first number of bits;
second input circuitry configured to receive a second input having a second number of bits;

first combinatorial circuitry coupled to the first input circuitry and the second input circuitry and configured to generate, based at least in part on the first input and the second input, a first subset of two or more partial products, wherein each of the two or more partial products comprises a respective product of bitwise multiplication of a respective bit of the second number of bits with each of the first number of bits, wherein the first combinatorial circuitry is configured to perform a combinatorial function to generate the first subset based at least in part on redundant form arithmetic; and carry chain circuitry, comprising:

second combinatorial circuitry coupled to the first input circuitry and the second input circuitry and configured to generate, based at least in part on the first input and the second input, a second subset of the two or more partial products; and one or more binary adders coupled to the second combinatorial circuitry, wherein the one or more binary adders are configured to generate a product based at least in part on a sum of the first subset and the second subset;

wherein one or both of the second combinatorial circuitry or the one or more binary adders are configured to receive the first subset from the first combinatorial circuitry.

14. The multiplier circuitry of claim 13, wherein the sum of the first subset and the second subset comprises a partial product, wherein the one or more binary adders are configured to sum the partial product with an additional partial product to generate the product.

15. The multiplier circuitry of claim 14, comprising third combinatorial circuitry, wherein the third combinatorial circuitry is configured to generate the additional partial product based at least on a compression of an additional two or more partial products.

16. The multiplier circuitry of claim 13, wherein the one or more binary adders comprise one or more ripple-carry binary adders.

17. The multiplier circuitry of claim 13, comprising routing circuitry, wherein:

the two or more partial products comprise two partial products; and the routing circuitry is configured to route a least significant bit of a first partial product of the two partial products to bypass the carry chain circuitry.

18. A tangible, non-transitory, machine-readable medium, comprising machine-readable instructions to construct multiplier circuitry that, when executed by one or more processors, cause the one or more processors to:

configure first combinatorial circuitry to perform a combinatorial function, based at least in part on redundant form arithmetic, to generate a first subset of two or more partial products, wherein the two or more partial products are based at least in part on a first input to the multiplier circuitry and a second input to the multiplier circuitry;

configure second combinatorial circuitry of a carry chain in the multiplier circuitry to generate a second subset of the two or more partial products based at least in part on the first input and the second input; and configure one or more binary ripple-carry adders of the carry chain to generate a product of the multiplier circuitry based at least in part on a sum of the two or more partial products.

19. The tangible, non-transitory, machine-readable medium of claim 18, wherein the machine-readable instructions, when executed by the one or more processors, cause the one or more processors to:

route one or more bits of the first input and one or more bits of the second input to one or both of first combinatorial circuitry or the second combinatorial circuitry to minimize a number of partial products included in the two or more partial products.

20. The tangible, non-transitory, machine-readable medium of claim 18, wherein the machine-readable instructions, when executed by the one or more processors, cause the one or more processors to:

determine the product based at least in part on a result generated by the multiplier circuitry in response to receiving the first input and the second input.

* * * * *